US007452431B2

(12) United States Patent
Gilkerson et al.

(10) Patent No.: US 7,452,431 B2
(45) Date of Patent: Nov. 18, 2008

(54) OPTICAL PRODUCT CURE OVEN

(75) Inventors: Jack A. Gilkerson, Wylie, TX (US); Mansour Jannati, Richardson, TX (US); Christopher W. Johnson, Sachse, TX (US)

(73) Assignee: Finisar Corporation, Sunnyvale, VA (US)

( * ) Notice: Subject to any disclaimer, the term of this patent is extended or adjusted under 35 U.S.C. 154(b) by 0 days.

(21) Appl. No.: 10/953,218

(22) Filed: Sep. 28, 2004

(65) Prior Publication Data

US 2006/0032573 A1 Feb. 16, 2006

Related U.S. Application Data

(60) Provisional application No. 60/592,665, filed on Jul. 30, 2004.

(51) Int. Cl.
*B32B 41/00* (2006.01)

(52) U.S. Cl. .......................... 156/64; 156/285; 700/274

(58) Field of Classification Search .................. 156/64, 156/285, 381; 432/4, 24
See application file for complete search history.

(56) References Cited

U.S. PATENT DOCUMENTS 4,547,242 A * 10/1985 Tusinski et al. ............. 156/105
5,772,835 A * 6/1998 Jordan et al. ................ 156/358

* cited by examiner

*Primary Examiner*—George R Koch, III
(74) *Attorney, Agent, or Firm*—Workman Nydegger

(57) ABSTRACT

A cure oven comprises a sealable door and one or more pressure valves mounted inside for curing optical subcomponents that have been assembled using an adhesive. The cure oven comprises a chamber that can be configured to receive several hundreds of assembled optical subcomponents. The cure oven is further coupled to a computerized system via a drive motor. The computerized system initiates the heating and cooling sequences, and indicates whether the door can be opened, or must remain shut. The cure oven maintains a certain pressure inside the oven chamber consistent with a rise in temperature, allowing assembled optical subcomponents to be cured at a much higher rate than possible without disassembling, or being damaged.

18 Claims, 4 Drawing Sheets

OPTICAL PRODUCT CURE OVEN

CROSS-REFERENCE TO RELATED APPLICATIONS

The present invention claims the benefit of priority to U.S. Provisional Patent Application No. 60/592,665, filed on Jul. 30, 2004, entitled “OPTICAL PRODUCT CURE OVEN”, the entire contents of which are incorporated herein by reference.

BACKGROUND OF THE INVENTION

1. The Field of the Invention

The present invention relates to systems, apparatus, and methods for curing optical components, such as optical assembly components that may be used in an optical transceiver.

2. Background and Relevant Art

Presently, systems and methods for manufacturing certain products, such as optical products and related subcomponents, can require great care, and can take a relatively long time. For example, form factor optical transceivers (e.g., SFF, SFP, XFP, etc.) can comprise several subcomponents that require precision instrumentation, or simply exercising a high degree of care, when aligning or assembling the subcomponents together.

In particular, typical form factor optical transceivers can comprise one or more Optical Sub-Assemblies (OSA), such as a Transmitter Optical Sub-Assembly (TOSA) and a Receiver Optical Sub-Assembly (ROSA). The individual OSAs are each assembled from a variety of sub-parts prior to being assembled on a transceiver. These OSA subparts typically include an OSA barrel that has a sealed end and an open end, and an optical subcomponent that is inserted into a cavity within the OSA barrel (or “barrel cavity”). An OSA optical subcomponent typically comprises an optical transmission or reception component, such as a laser diode, or a photodiode. In some cases, these subcomponents are assembled together using specialized epoxies that can create unique constraints.

As shown in FIG. 1, for example, when assembling the optical subcomponent 102 inside an OSA barrel 108, a manufacturer typically first places an epoxy 103 inside the open portion 104 of the barrel. The manufacturer then aligns the optical subcomponent inside the open portion of the barrel cavity 104, such that the optical subcomponent 102 binds to the barrel cavity 104 inner walls as the epoxy 103 hardens, forming a second sealed end. The manufacturer then places the combined subcomponent 102 and optical barrel 108 in an environment where the epoxy can be cured. Once the manufacturer has cured the epoxy 103, the manufacture can position the combined subcomponents (i.e., an assembled, cured OSA) in an optical transceiver.

Unfortunately, when an optical component is placed inside an optical barrel containing epoxy, a small amount of air (e.g., space 106) becomes trapped between the optical subcomponent and the first sealed end of the barrel cavity. Ordinarily, the air pocket 106 does not pose a substantial problem if the epoxy 103 hardens at room temperature. If a manufacturer raises the temperature too quickly, however, such as raising the temperature to a temperature that is greater than room temperature, the epoxy 103 can become less viscous (more fluid) at the same time that the air expands.

In one scenario, air expansion may force the less-viscous epoxy to ooze out of the assembled OSA 117 during the curing process, such that there is insufficient epoxy to form a bond between the optical subcomponent and the OSA barrel. In another scenario, the epoxy may become less able to contain the one or more expanding air pockets 106, which can cause the optical subcomponent 102 to blow apart from the optical barrel 108. In still another scenario, the air can form one or more bubbles in the epoxy, which, when popped, can become a gap in the joint between the optical component and the optical barrel. As such, the bond is weaker between the OSA subcomponents 102 and 108; and, further, the bond is leaky—that is, not water (or humidity) tight.

There are, of course, a variety of epoxies that can be used to bond two or more OSA subcomponents together. Generally, one epoxy can be distinguished from another epoxy based on essentially two essential parts in both epoxies—the base material and the “initiator”. In particular, an epoxy manufacturer can modify the base material and initiator in order to give an epoxy, for example, different strengths, different heat resistance, different cure time, different cure method, and other related properties. Of course, one can appreciate that advantages with one epoxy property may come at the expense of disadvantages of another epoxy property. For example, an epoxy that is very strong and resilient to certain environmental factors may take tens of hours to properly cure at room temperature. Alternatively, a weaker epoxy may cure within only a few minutes at room temperature.

In general, conventional epoxies that are used in the assembly of optical subcomponents, especially Vertical Cavity Surface Emitting Laser (VCSEL) subcomponents, can take as many as between approximately 10 to approximately 20 hours to cure at room temperature. Other epoxies that may be desirable to use with certain optical applications (e.g., due to special heat resistance properties) may take up to approximately 40 hours to cure at room temperature. Unfortunately, the types of epoxies used for bonding conventional optical components—as well as the rather small, precisely aligned optical component parts—do not lend to speeding up the curing process with added heat.

Thus, conventional methods for curing epoxies in optical components often involve rather long two-step processes. In one example, a manufacturer may first let the epoxies harden to a predetermined level at room temperature. After the epoxy has hardened a specified amount, the manufacturer might then heat the epoxy to a temperature that is greater than room temperature, in order to finalize the curing process. Unfortunately, the time it takes for conventional optical epoxies to harden sufficiently at room temperature can be anywhere from approximately 12 hours to approximately 30 hours, depending in part on the heat resistance of the given epoxy.

Other conventional curing processes can reduce the overall cure time for the epoxy, but nevertheless increase the number of required production steps. For example, a manufacturer may perforate at least a portion of the OSA barrel so that air can escape. Since the manufacturer has perforated the OSA barrel, the air can escape as the air expands, such that the air does not create air bubbles in the epoxy, or does not force the epoxy out from the assembly. Thus, the manufacturer can then cure the epoxy at an elevated temperature so that the epoxy cures more quickly.

Unfortunately, perforating an OSA barrel sometimes requires an additional processing step after the OSA barrel has been manufactured. Furthermore, since perforations can open the optical subcomponents to water (or humidity) damage, the manufacturer may still need to cover the perforations in some way after the epoxy cures. This requires still another processing step. As such, perforating one or more subcomponents to release expanding air during a curing process can be fairly inefficient, or can lead to lower quality OSAs.

Accordingly, an advantage in the art can be realized with systems, apparatus, and methods for curing a large number of adhesive bonds between small components in a relatively short time. In particular, an advantage in the art can be realized with systems, apparatus, and methods that allow epoxy bonds between optical form factor components and subcomponents to cure efficiently, without requiring extra manufacturing steps.

BRIEF SUMMARY OF THE INVENTION

The present invention solves one or more of the foregoing problems in the prior art with systems, apparatus, and methods for curing adhesives efficiently at a relatively higher rate than otherwise possible. In particular, an oven can be configured to cure two or more optical subcomponents of an optical assembly at a certain pressure, such that the two subcomponents adhere to one another without being broken apart.

In at least one implementation, an oven for curing one or more optical subcomponents includes a chamber having a sealable door. The sealable door can be used to maintain an appropriate, relatively air-tight pressure within the chamber after the door has been closed. Furthermore, the oven can comprise a locking mechanism that is configured to hold the sealable door closed at elevated pressures, and further enables the oven to maintain a certain pressure with elevated temperature.

One or more heating elements inside the cure oven can be used to heat the oven to one or more specific temperatures, such as a final target curing temperature, or one or more intermediate temperatures. Pressure valves inside the chamber can be manipulated to add or release pressure inside the cure oven as appropriate for a given internal temperature. In particular, pressure valves can ensure that a given temperature or pressure is substantially proportional to the temperature and pressure prior to heating the cure oven.

Additional features and advantages of implementations of the invention will be set forth in the description which follows, and in part will be obvious from the description, or may be learned by the practice of such implementations. The features and advantages of such implementations may be realized and obtained by means of the instruments and combinations particularly pointed out in the appended claims. These and other features will become more fully apparent from the following description and appended claims, or may be learned by the practice of such implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, apparatus, and methods for curing adhesives efficiently at a relatively higher rate than otherwise possible. In particular, an oven can be configured to cure two or more optical subcomponents of an optical assembly at a certain pressure, such that the two subcomponents adhere to one another without being broken apart.

Figure 1:
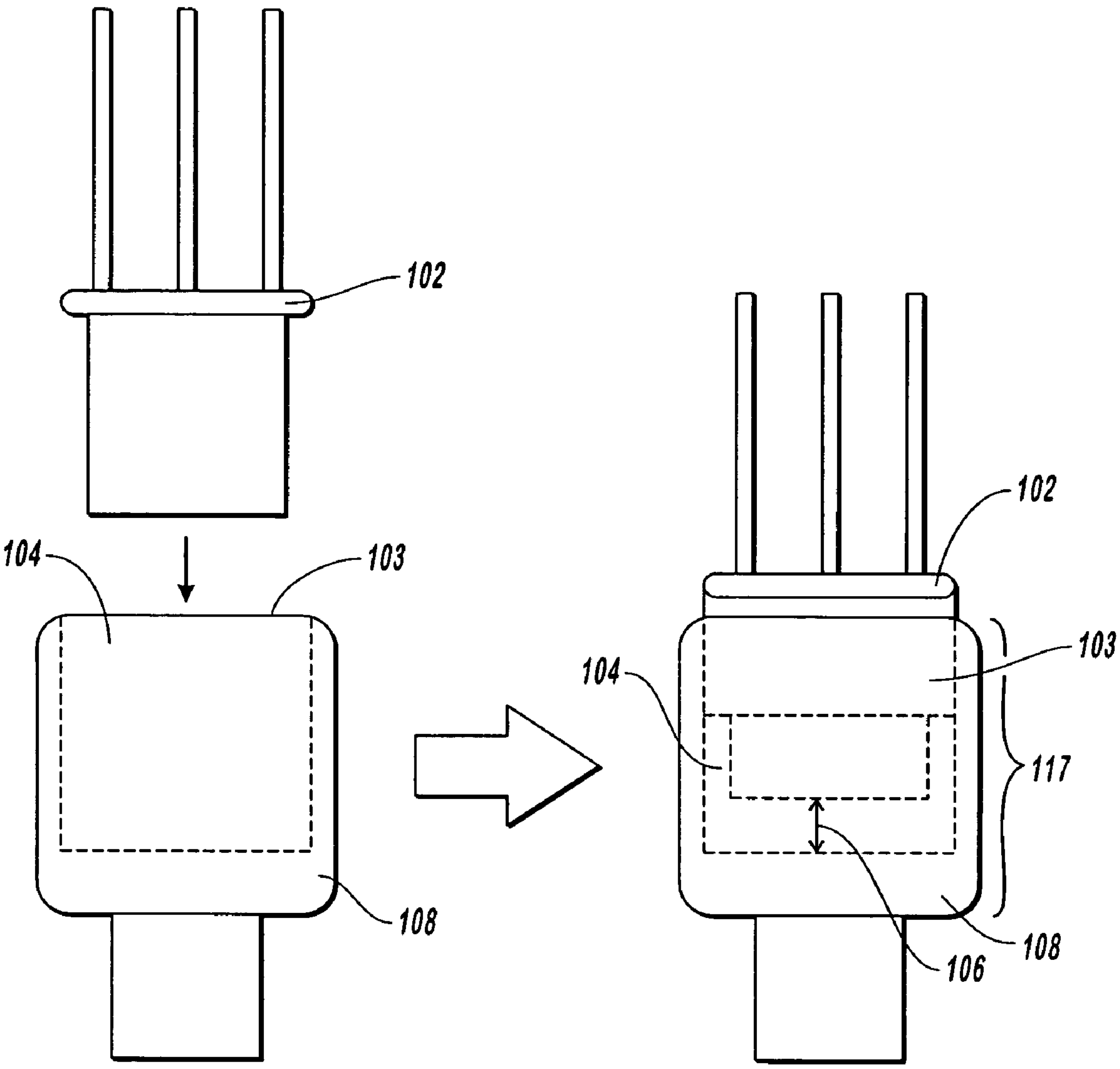
Fig. 1 (Prior Art)
FIG. 1 illustrates a prior art diagram in which an optical subcomponent is combined with a barrel cavity, creating an air pocket.
Figure 2:
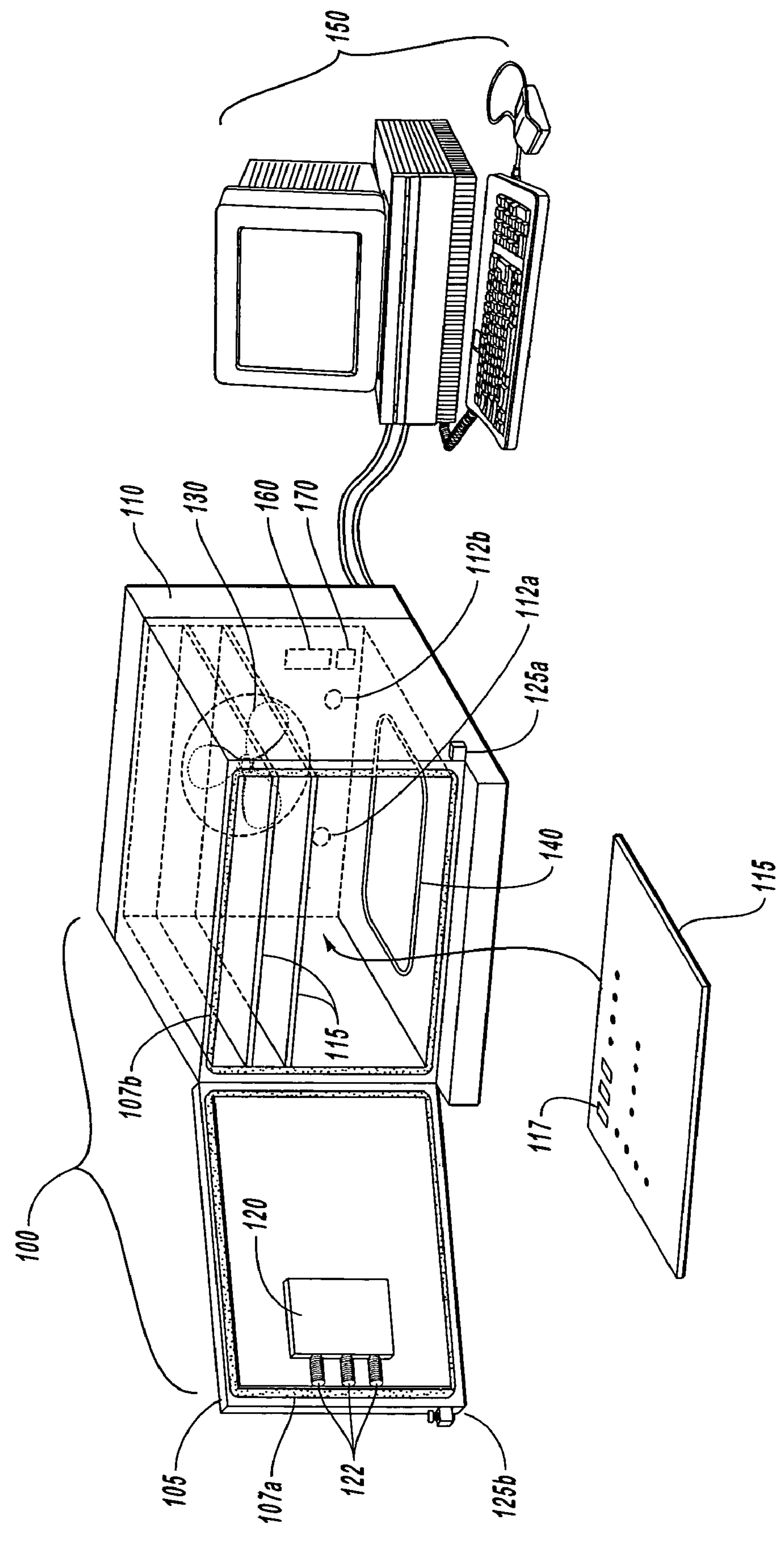
FIG. 2 illustrates an implementation of a pressurized curing system in accordance with an implementation of the present invention.

In particular, FIG. 2 illustrates one implementation of a system for curing adhesives, such as epoxy adhesives, used to assemble optical subcomponents. As shown, an exemplary system can comprise a cure oven 100 that is configured to adjust internal pressure inside the cure oven 100 chamber while adjusting heat to a critical temperature. As will be understood from the present specification and claims, the system is designed in such a way that assembled optical subcomponents can be cured rapidly and efficiently.

In one implementation, an exemplary cure oven 100 comprises a steel, inner chamber that is approximately 64" tall, approximately 40" wide, and approximately 52" deep. Of course, other dimensions may be appropriate depending on a manufacturer's needs. At this size, the inner chamber can be configured to receive one or more trays 115. In at least one implementation, a tray 115 is configured to hold as many as between approximately 500 and approximately 600 assembled optical subcomponents 117, which have been assembled together in an initial state with an adhesive (i.e., but yet not cured), such as an epoxy. Accordingly, 5 or 6 trays can be inserted in the cure oven 100 chamber to cure between approximately 2500 to approximately 3600 assembled optical subcomponents 117.

As used herein, frequent reference is made to the term "epoxy", which is a type of adhesive that can be used in implementations of the present invention. One will appreciate, however, that there can be many types of adhesives that may be suitable for assembling optical subcomponents within the context of the present invention. Some suitable adhesives that can be used in various implementations can include the many types of epoxy adhesives (epoxide resin with hardener), phenol adhesives (phenol-formaldehyde), urea-formaldehyde resins, natural adhesives, rubber cement, polyvinyl chloride and related copolymers, and so forth.

Continuing with FIG. 2, the exemplary cure oven 100 further comprises one or more heating elements 140 and one or more fans 130 that are used to raise the temperature of the chamber, and to distribute heat evenly within the chamber. The exemplary cure oven 100 also comprises one or more pressure valves 112*a*, and 112*b* that can be used to maintain an even, appropriate pressure within the chamber. In particular, the one or more pressure valves 112*a* and 112*b* can release or add pressure in response to readings from a pressure gauge 160 and a temperature sensor 170 as the temperature changes. As such, when the pressure is below or above an optimum for a given temperature that is read at the temperature sensor 170, the pressure valves 112*a* and 112*b* can be used to increase or decrease internal chamber pressure as appropriate.

FIG. 2 further illustrates that a drive motor 110 can be used to couple operation of one or more components of the cure oven 100 to a computerized system 150, such as a desktop computer. Thus, the drive motor 110 can include any number of suitable connection interfaces, such as a serial interface, a parallel interface, a USB interface, a Firewire interface, a SCSI interface, and so forth. Furthermore, although it is not expressly shown, one will appreciate that the drive motor 110 comprises all the mechanical components to operate as instructed by a computerized system 150. Similarly, one will appreciate that the drive motor 110 comprises all the active and/or passive circuitry components, circuit traces, processing modules, and so forth necessary to relay active or passive electronic signals between one or more components and the computerized system 150.

In general, the computerized system 150 can be configured to control such components in the cure oven 100 as the pressure valves 112*a* and 112*b*, the pressure gauge 160, the temperature sensor 170, the fan 130, the heating elements 140, and the locking mechanism 120. For example, as will be detailed in the following Figures, a signal received from the pressure gauge 160 and/or the temperature sensor 170 can cause the computerized system 150 to send a corresponding electronic signal to the pressure valves 112*a* and 112*b*, and adjust internal pressure as appropriate. In addition, the computerized system 150 can also be configured to start or stop the heating elements 140, start or stop the fan 130, and lock or unlock the locking mechanism 120.

The exemplary cure oven 100 is further shown comprising a sealable door 105. In one implementation, the door 105 can be sealed shut through corresponding air and/or pressure-tight seals 107*a* and 107*b*, such as corresponding O-rings. Thus, when an operator shuts the door and locks it, a consistent, air-tight pressure can be maintained within the cure oven 100 chamber. To help seal the door shut against higher pressures, corresponding threaded cavities in the cure oven 100 chamber. Additional safety latches 125*a* and 125*b* can be further implemented to hold the door relatively closed in case the locking mechanism 120 fails. Accordingly, a number of safety mechanisms can be implemented for the benefit of the operator, and the assembled subcomponents inside.

Figure 3:
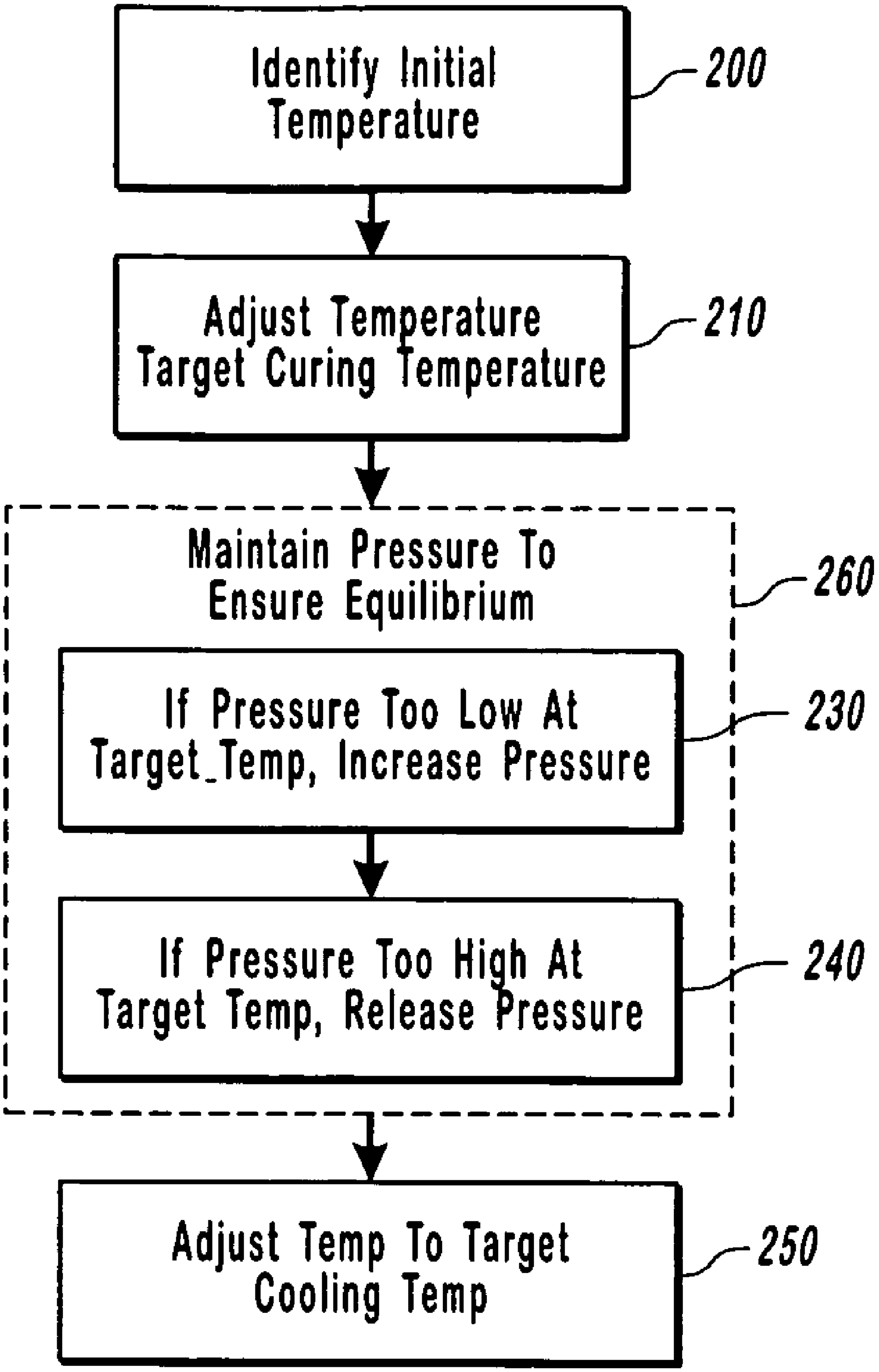
FIG. 3 illustrates an example method comprising steps and acts for curing an adhesive in accordance with the present invention.
Figure 4:
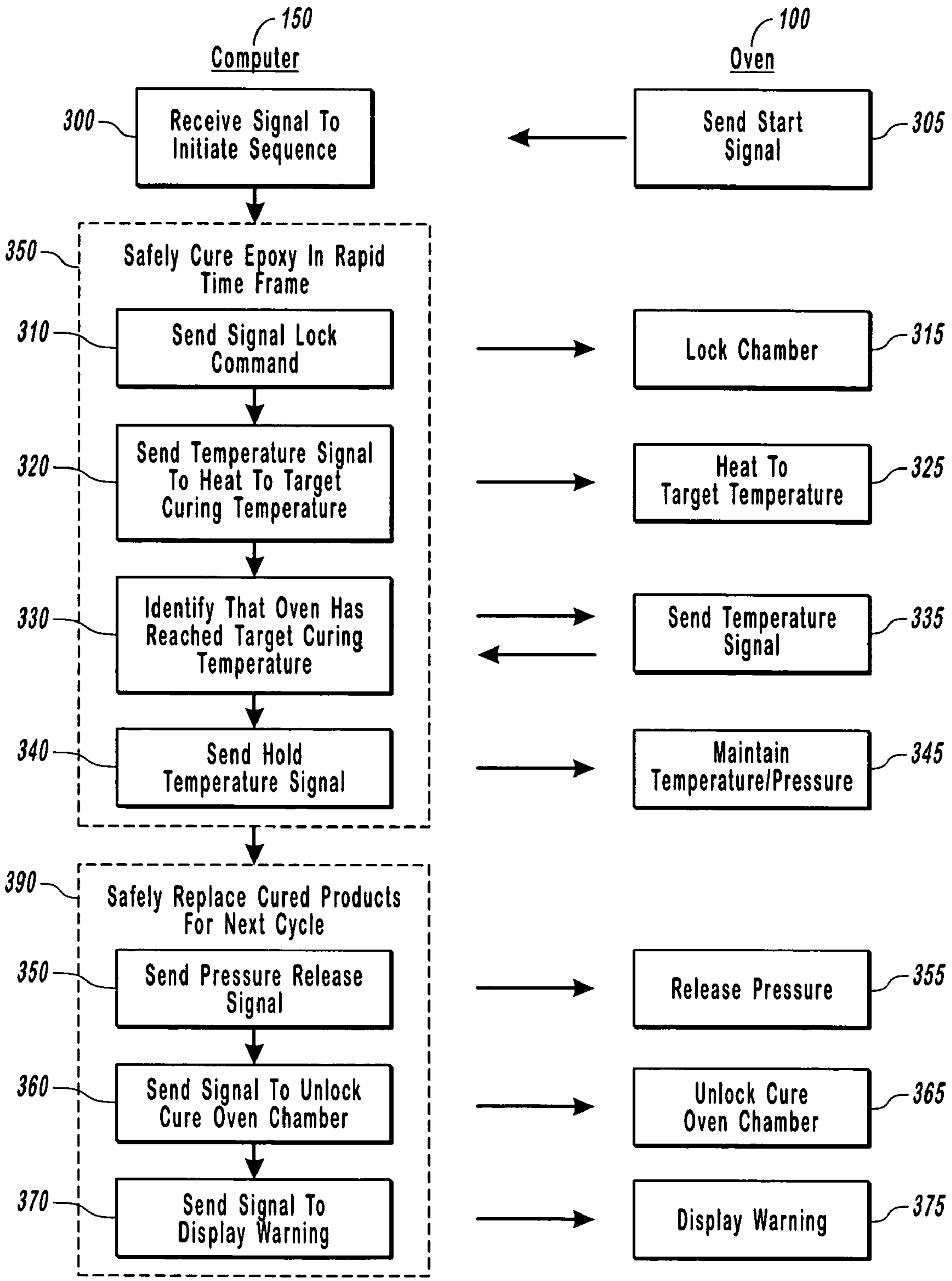
FIG. 4 illustrates an example method comprising exemplary steps and acts for safely curing assembled subcomponents in a pressurized environment in accordance with the present invention.

The present invention can also be described in conjunction with methods having one or more functional steps and one or more corresponding non-functional acts for implementing the inventive system and apparatus. In at least some cases, the methods can be implemented manually, while in other cases, the methods can be implemented automatically with reference to computer-executable instructions corresponding to the following methods. In any case, FIG. 3 illustrates a method comprising corresponding steps for (and corresponding acts of) rapidly curing an adhesive between two or more optical subcomponents. FIG. 4 illustrates a method comprising steps for (and corresponding acts of) using one or more safety features in conjunction with rapidly curing an adhesive used to assemble two or more optical subcomponents.

As shown in FIG. 3, for example, a method for curing an adhesive between two or more optical subcomponents comprises an act 200 of identifying an initial temperature. Act 200 can include identifying an initial temperature of a cure oven 100 chamber prior to initiating a curing sequence. For example, a digital pressure gauge 160 and a digital temperature sensor 170 can be configured to send an electrical signal that indicates the corresponding pressure or temperature value to computerized system 150. Alternatively, the computerized system 150 can take periodic readings from a mechanical temperature gauge 170 and a mechanical pressure gauge 160. In another implementation, a drive motor 110 reads a pressure gauge 160 and a temperature sensor 170, processes the readings, and communicates the readings back and forth with a computerized system 150.

The method further comprises an act 210 of adjusting temperature to a target curing temperature. Act 210 can include adjusting the temperature of the cure oven 100 chamber to a target curing temperature that is suitable for curing a specified adhesive. For example, in one implementation, an adhesive that otherwise cures at approximately 25° C. (i.e., room temperature) between approximately 10 hours and approximately 20 hours may be cured at, for example, 60° C. in approximately 2 hours. In such an implementation, therefore, the computerized system 150 initiates the heating elements 140, and raise the temperature to 60° C.

The method further comprises a functional step 260 for maintaining pressure to ensure equilibrium. Step 260 includes maintaining pressure to ensure equilibrium inside the cure oven 100 chamber such that the pressure inside the cure oven 100 chamber is not substantially less than the pressure of any air pocket within one or more optical subcomponents that have been assembled together with the adhesive. For example, if the cure oven 100 chamber pressure were otherwise substantially less than the pressure of an air pocket between two assembled subcomponents, the subcomponents may split apart. Alternatively, a reverse type of damage may otherwise occur if the pressure inside the cure oven 100 chamber is substantially greater than an air pocket between the assembled subcomponents 117.

Accordingly, step 260 comprises one or more non-functional acts for maintaining the proper pressure inside the cure oven 100. Although step 260 can comprise any number or combination of corresponding acts, step 260 comprises an act 230 of increasing pressure upon identifying that the pressure is too low at a given target temperature. For example, the cure oven 100 can be heated over time in accordance with a series of given temperatures and pressures based on a given initial temperature and pressure, such as atmospheric pressure.

In one implementation, the series of identified temperature and pressure values can be compared to a stored temperature and pressure table, such that the values are calculated in advance. In another implementation, an identified temperature and pressure is compared with a calculated nominal value. In any case, each subsequent temperature and pressure at any number of given reference points is guided by the equation:

$$P_1V_1=nRT_1$$

Since, however, volume ($V_1$), and the nature of the gas (air–nR) inside the chamber remain relatively unchanged, the primary consideration is the relationship between pressure ($P_1$) and temperature ($T_1$), or:

$$P_1 \alpha T_1$$

Accordingly, if an initial temperature ($T_1$) is 25° C., and an intermediate temperature ($T_2$) is 35° C. at a subsequent point in time, the cure oven 100 will ensure that the corresponding intermediate pressure ($P_2$) is at least roughly equal to $P_1(T_2/T_1)=P_1(35/25)$, or $1.4P_1$. Alternatively, at the final, or target curing temperature of 60° C., the final, or target curing pressure would need to be roughly equal to $P_1(60/25)$, or $2.4P_1$. Thus, for example, if a computerized system 150 identified that the pressure in the cure oven 100 chamber were significantly less than, for example, $2.4P_1$ at the target curing temperature, the computerized system could send an electronic signal to one or more pressure valves (e.g., valves 124*a* 124*b*) to increase the pressure as appropriate.

Step 260 further comprises an act 240 of releasing pressure inside the cure oven 100 if the pressure is too high for a target temperature. Act 240 can include releasing pressure inside the cure oven 100 through one or more release valves 124*a* and 124*b* if the pressure is determined to be too high so that the pressure inside the cure oven 100 is within an expected range. For example, if a computerized system 150 identifies that the pressure in the cure oven 100 chamber were significantly more than, for example, $2.4P_1$ at the target curing temperature, the computerized system could send an electronic signal to one or more pressure valves 124*a*, 124*b* to release the pressure as appropriate. Thus, the cure oven 100 can ensure that the internal pressure is at least roughly equally to the idealized target curing pressure. Furthermore, the pressure in the cure oven 100 can be adjusted for pressure loss in a given cure cycle to ensure uniform pressure at one or more intermediate points in time.

As also shown in FIG. 3, the method further comprises an act 250 of adjusting the temperature to a target cooling temperature. In particular, act 250 can include adjusting the cure oven 100 temperature to a target cooling temperature after the adhesive has been cured, such that an operator can remove the assembled subcomponents 117 from the cure oven 100. For example, the computerized system can send an electronic signal to the one or more pressure valves 124*a* and 124*b*, wherein the valves release the internal pressure outside of the cure oven 100. Once the pressure has been released, the cure oven 100 can be cooled such as by opening the door 105 at least partially to let hot air escape. In another example, the cure oven 100 can comprise cooling or refrigerant components (not shown), such as a Freon module that can be used to cool the oven rapidly. The operators can then remove the now-cured, assembled optical subcomponents 117 from the cure oven 100.

In some cases, it may be further necessary to cure the adhesive at another, or second, elevated target temperature before the optical subcomponents 117 are cooled to room temperature. For example, a "B-stage" adhesive can cure to about 70-90% of ultimate hardness (i.e., the "B-stage") at a lower temperature, but may require higher temperature to be cured fully to about 100% (i.e., $T_g$, or the "Glass Transition Temperature"). It may not, however, be necessary to raise the pressure to match the elevated temperature at this point since the B-stage of the adhesive is sufficiently hard to avoid blowout.

As such, the method of FIG. 3 can further comprise an act of raising the temperature and/or pressure (if necessary) inside the cure oven 100 to a second elevated temperature, until the adhesive is fully cured. In one implementation, for example, assuming the prior example of 60° C. represented the "B-stage" temperature of the example adhesive, the computerized system 150 can then send an electronic signal to the cure oven 100 that causes the cure oven 100 to raise the internal temperature to about 120° C. for about 20-30 minutes. In another implementation, the operator can simply remove the optical assemblies and place them in another preheated oven (not shown) at about 120° C. for about 20-30 minutes. In such a case, the cure oven 100 can be part of one or more ovens in a cure oven system. A system of cure ovens 100 may be helpful in some cases to aid processing of several optical assembly batches with some efficiency, depending on the type of adhesive used, rather than having all optical assemblies be cured at two temperatures in the same cure oven.

FIG. 4 illustrates a method for implementing a variety of safety procedures for curing one or more assembled subcomponents 117 from the perspective of the computerized system 150, and from the perspective of the curing cure oven 100. In particular, the method comprises an act 300 of receiving a signal to initiate a curing sequence. Act 300 can include receiving an initial curing sequence command that is received through an attached keyboard at the computerized system. For example, an operator can execute a start command through one or more user control options displayed via a user interface at the computerized system 150. Alternatively, an operator can depress a corresponding user control such as a start button at the cure oven 100, causing the cure oven 100 to perform an act 305 of sending the initiate curing sequence command.

The method further comprises a step 350 for safely curing the adhesive in a rapid time frame. Step 350 can include safely curing the adhesive used to assembly two or more optical subcomponents at a relatively high pressure, such that the subcomponents can be cured more quickly at a higher temperature than otherwise possible, without significant risk to the operator. For example, the computerized system 150 can ensure that the cure oven 100 door 105 remains closed during an elevated pressure curing cycles, such that the operator is prohibited from opening the cure oven 100 door 105 during a curing cycle. As will be understood from the present specification and claims, the computerized system 150 can therefore prevent danger to the operator, and prevent ruining optical subcomponents 117 inside the cure oven 100.

Although step 350 can comprise any number or combination of corresponding acts, FIG. 4 shows that step 350 comprises an act 310 of the computerized system 150 sending a signal lock command. Act 310 includes sending a signal lock command to the curing cure oven 100, such that the locking mechanism 120 secures the door 105 in a closed position. For example, the signal lock command can comprise computer-executable instructions sent to a drive motor 110, which in turn operates the locking mechanism 120. The drive motor 110 can then perform a corresponding act 315 of locking the cure oven 100 by rotating threaded locks 122 into corresponding threaded cavities (not shown) in the cure oven 100 chamber after the door 105 has been shut.

As shown, step 350 further comprises an act 320 of sending a temperature signal to heat the cure oven 100 to a target curing temperature. Act 320 can include sending an electronic signal to, for example, the drive motor 110, which indicates that the cure oven 100 should be heated to a given next temperature. For example, if the operator desires to reach the target curing temperature as soon as possible, the desired next temperature would be the final, target curing temperature. Alternatively, if the operator desires to heat the cure oven 100 over several successive intervals, the signal can comprise at least one of an intermediate target temperature or a table of intermediate target temperatures before reaching the target curing temperature. Upon receiving the electronic signal from the computerized system 150, the cure oven 100 then performs an act 325 of heating to the indicated target temperature.

In addition, step 350 comprises an act 330 of identifying that the cure oven 100 has reached the target curing temperature. Act 330 can include identifying that the cure oven 100 has reached the target cure temperature upon identifying the final target temperature via the temperature sensor 170. As previously described, this can include the computerized system 150 monitoring a mechanical temperature sensor 170 to identify the cure oven 100 temperature at a given instance in time. For example, the temperature sensor 170 can include electrodes that increases amplitude of an alternating current as the temperature increases. The computerized system 150 can be either read at the temperature sensor 170 directly, or can read data from the temperature sensor that is stored at the drive motor 110.

Alternatively, the cure oven 100 can perform an act 335 of sending a temperature signal directly to the computerized system 150 at one or more predetermined intervals of time. For example, the temperature sensor 170 at the cure oven 100 can be configured to send a digital temperature signal to the drive motor 110, or directly to the computerized system 150. Thus, the computerized system 150 and cure oven 100 can communicate in one or two-way data transmissions.

Step 350 further comprises an act 340 of sending a hold temperature signal to the cure oven 100. Act 340 can include sending a hold temperature signal to the cure oven 100 after identifying that the target curing temperature has been reached. For example, when the computerized system 150 identifies the target curing temperature, or identifies that the heat is close to the target curing temperature, the computerized system 150 can instruct the cure oven 100 to hold the temperature for a predetermined length of time. In at least one implementation, the predetermined length of time is approximately 2 hours for the chosen adhesive.

In response, the cure oven 100 can perform an act 345 of maintaining the target curing temperature and pressure. For example, the cure oven 100, via the drive motor 110 can stop the heating elements 140 from heating further at an increased temperature. Alternatively, the cure oven 100, via the drive motor 110, can hold the heating elements 140 at a given temperature. Similarly, the cure oven 100, also via the drive motor 110, can turn the heating elements 140 on iteratively to ensure the curing temperature does not drop below a certain threshold. Throughout the heating, the cure oven 100 can also adjust internal pressure, as appropriate for the given temperature, through pressure valves 124*a* and 124*b*.

As shown in FIG. 4, the method further comprises a functional step 390 for safely replacing cured optical products for a next cycle. Step 390 can include safely replacing cured optical products for a next curing cycle such that an operator can open the cure oven 100 safely, and such that the operator is at least warned from placing a new set of assembled optical subcomponents 117 into the cure oven 100 at a certain temperature. Although step 390 can comprise any number or order of corresponding non-functional acts, FIG. 4 shows that step 390 comprises an act 350 of sending a pressure release signal.

Act 350 can include sending a pressure release signal to the cure oven 100 so that pressure can be released through the pressure valves 124*a* and 124*b* prior to opening the door 105. For example, after a certain time has elapsed at the target curing temperature, the computerized system 150 can send instructions to the drive motor 110. The instructions cause the cure oven 100 to perform an act 355 of releasing pressure from within the cure oven 100 through pressure valves 124*a* and 124*b*. Generally speaking, since the adhesive will have substantially cured at this point, the release in pressure will not cause damage to the assembled subcomponents 117.

Step 390 further comprises an act 360 of sending an unlock signal to the cure oven 100. Act 360 can include sending an unlock signal to the cure oven 100 such that the locking mechanism 120 releases the threaded locking members 122 from the corresponding cavities within the cure oven 100 chamber. For example, the computerized system 150 can send unlock instructions to the drive motor 110, or directly to the locking mechanism 120 through a corresponding computerized interface.

In response to the instructions, the cure oven 100 can perform an act 365 of unlocking the cure oven 100. For example, the cure oven 100, via the locking mechanism 120, or via the drive motor 110 and the locking mechanism 120, can unscrew the threaded locking members 122 from the corresponding cavities. Accordingly, an operator can only open the door 105 after the computerized system 150 has allowed the door 105 to be opened, and only after the high pressure has been released from the cure oven 100.

Furthermore, step 390 comprises an act 370 of sending a signal to display a warning. Act 370 can include sending instructions to the cure oven 100 to display a warning that the cure oven 100 is still too hot to place a new set of assembled subcomponents 117 into the cure oven 100 chamber. For example, even though the cure oven 100 can be cool enough for an operator to remove trays 115 from the cure oven 100, the cure oven 100 can still be too hot to place new trays 115 inside. In particular, the cure oven 100 may be still hot enough to cause a new set of assembled subcomponents 117 to blow apart.

Thus, the computerized system 150 can warn an operator not to place new trays 115 into the cure oven 100 until, for example, the computerized system 150 has read an appropriate value at the temperature sensor 170. In response to the instructions, therefore, the cure oven 100 can perform an act 375 of displaying a warning to the user. For example, an electronic display (not shown) that is positioned outside of the door 105, or a display at the computerized system 150, can show one or more messages to a user, including a warning not to place new trays 115 into the cure oven 100.

There are, of course, additional safety considerations that can be made with the present invention with respect to the assembled optical sub-components 117. For example, in one implementation, the cure oven 100 is configured such that, if any heating apparatus fail (i.e., unexpected temperature drop, or if temperature does not increase at any appropriate rate), the computerized system 150 can maintain the internal pressure. In some cases, maintaining the pressure at a constant level can be configured as a default mechanism that is not changed until specified otherwise, such as by an operator interacting through the computerized system.

In other cases, the computerized system 150 can iteratively identify an inappropriate dropping of the internal temperature of the cure oven 10, and adjust the pressure accordingly through pressure valves 112*a-b*. Alternatively, the computerized system can simply hold pressure constant, despite the temperature failure, through proper adjustment of the pressure valves 112*a-b* until the temperature issues can be resolved. In either case, maintaining an appropriate pressure in light of an unexpected temperature drop can ensure that the assembled optical sub-components 117 do not blow out with a corresponding temperature decrease.

Accordingly, presently-described implementations of the present invention allow one or more optical products to be cured at a much faster rate than otherwise possible using conventional methods. Furthermore, present implementations are particularly useful for mass-production techniques, and so present a significant advantage to optical component manufacturers. Since the foregoing can also be implemented with a high degree of safety, the present invention also represents an advantage for operators of the described systems, apparatus, and methods.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for curing adhesive used in the joining together of one or more optical sub-components of an optical component, the method comprising the acts of:

pressurizing a gas inside an oven chamber within which the optical sub-components are disposed;

adjusting the temperature within the oven chamber to a target curing temperature;

monitoring the gas pressure in the oven chamber;

if the gas pressure inside the oven chamber is too low at the target temperature compared to an ideal gas pressure, increasing the gas pressure inside the oven chamber until the gas pressure in the oven chamber is substantially equal to the ideal gas pressure; and if the gas pressure inside the oven chamber is too high at the target temperature compared to the ideal gas pressure, reducing the gas pressure inside the oven chamber until the gas pressure in the oven chamber is substantially equal to the ideal gas pressure.

2. The method as recited in claim 1, further comprising an act of adjusting the temperature inside the oven chamber to a target cooling temperature.

3. The method as recited in claim 2, further comprising depressurizing the oven chamber after the adhesive joining the optical sub-components has been cured.

4. The method as recited in claim 1, wherein the one or more optical components comprise one or more optical sub-assemblies, each optical sub-assembly comprising a TOSA or a ROSA.

5. The method as recited in claim 1, wherein one of the acts is controlled by a computerized system.

6. The method as recited in claim 5, wherein the target curing temperature and ideal pressure are obtained from a table on the computerized system.

7. The method as recited in claim 1, further comprising adjusting the temperature inside the pressurized oven chamber to a second target curing temperature after a specified time period.

8. The method as recited in claim 7, further comprising adjusting the pressure inside the pressurized oven chamber to a second ideal pressure corresponding to the second target curing temperature.

9. A method for manufacturing an optical component, the method comprising the acts of assembling, for each optical component, one or more optical sub-components together with an adhesive into an assembled optical component;

positioning the one or more assembled optical components in an oven chamber;

identifying an initial temperature and an initial pressure inside the oven chamber;

changing the temperature in the oven chamber to a subsequent temperature within a predetermined time period;

identifying an ideal pressure based at least in part on the initial pressure, the initial temperature, and the sub sequent temperature;

comparing a subsequent pressure inside the oven chamber with the ideal pressure; and adjusting the pressure inside the oven chamber if the subsequent pressure is different from the ideal pressure.

10. The method as recited in claim 9, further comprising heating the one or more assembled optical components to a desired temperature for a predetermined time period after reaching a b-stage temperature for the adhesive.

11. The method as recited in claim 10, wherein heating the one or more assembled optical components is performed in a second oven.

12. The method as recited in claim 10, further comprising:

identifying that the temperature in the oven chamber has dropped unexpectedly; and maintaining the pressure in the oven chamber at a constant value.

13. The method as recited in claim 9, wherein the one or more optical sub-components comprises 500 or more optical sub-components.

14. The method as recited in claim 9, wherein the one or more optical components comprise one or more optical sub-assemblies, each optical sub-assembly comprising a TOSA or a ROSA.

15. The method as recited in claim 9, wherein one of the acts is controlled by a computerized system.

16. The method as recited in claim 9, wherein the ideal pressure is proportional to the subsequent temperature.

17. The method as recited in claim 9, wherein the ideal pressure is inversely proportional to the initial temperature.

18. The method as recited in claim 9, wherein the ideal pressure is proportional to the initial pressure.

* * * * *

UNITED STATES PATENT AND TRADEMARK OFFICE

CERTIFICATE OF CORRECTION

PATENT NO. : 7,452,431 B2
APPLICATION NO. : 10/953218
DATED : November 18, 2008
INVENTOR(S) : Gilkerson et al.

It is certified that error appears in the above-identified patent and that said Letters Patent is hereby corrected as shown below:

Column 1
Line 38, change "laser diode," to --laser diode--
Line 44, insert --108-- after "barrel"
Line 50, insert --103-- after "epoxy"
Line 67, insert --102-- after "subcomponent"
Line 67, insert --108-- after "barrel"

Column 2
Line 1, insert --103-- after "epoxy"
Line 6, change "optical component" to --optical subcomponent 102--

Column 3
Line 55, change "thereof which" to --thereof that--

Column 4
Line 38, insert --115-- after "trays"

Column 5
Line 36, insert --122-- after "cavities"
Line 56, insert --and with continuing reference to FIG. 2,-- after "FIG. 3,"

Column 7
Line 64, insert --100-- after "oven"

Column 9
Line 44, change "350" to --380--
Line 46, change "350" to --380--

Column 10
Line 33, change "fail" to --fails--
Line 42, change "10" to --100--
Line 44, add "150" after --system--

Signed and Sealed this

Twenty-third Day of February, 2010

David J. Kappos

David J. Kappos
*Director of the United States Patent and Trademark Office*